United States Patent
Ramaswamy et al.

(10) Patent No.: US 9,503,677 B1
(45) Date of Patent: Nov. 22, 2016

(54) RECTIFYING CAMERA PAIRS

(71) Applicant: Amazon Technologies, Inc., Reno, NV (US)

(72) Inventors: Sharadh Ramaswamy, Sunnyvale, CA (US); Volodymyr V. Ivanchenko, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 512 days.

(21) Appl. No.: 13/689,126

(22) Filed: Nov. 29, 2012

(51) Int. Cl.
*H04N 13/02* (2006.01)
*H04N 7/00* (2011.01)

(52) U.S. Cl.
CPC ............... *H04N 7/00* (2013.01); *H04N 13/02* (2013.01)

(58) Field of Classification Search
CPC .................................. H04N 7/00; H04N 13/02
See application file for complete search history.

(56) References Cited

U.S. PATENT DOCUMENTS

| | | | |
|---|---|---|---|
| 2003/0156751 A1* | 8/2003 | Lee | G06K 9/03 382/154 |
| 2008/0266396 A1* | 10/2008 | Stein | G06K 9/00805 348/148 |
| 2010/0134688 A1* | 6/2010 | Moriwake | G06K 9/00228 348/586 |

OTHER PUBLICATIONS

Minoru Ito and Akira Ishii, "A Three-Level Checkerboard Pattern (TCP) Projection Method for Curved Surface Measurement," Pattern Recognition, vol. 28, No. 1, pp. 27-40, 1995.*

* cited by examiner

*Primary Examiner* — Thai Tran
*Assistant Examiner* — Christopher T Braniff
(74) *Attorney, Agent, or Firm* — Polsinelli LLP (57) ABSTRACT

The quality of stereoscopic imaging using cameras with wide angle lenses can be improved using various calibration approaches to determine distortions or misalignments between the cameras. A calibration object such as a checkered grid with a determined inclination between portions can be used to provide lateral calibration as well as depth information. Intersections of the checkered regions can be used to determine intersection points for the calibration object in the image. Regions about at least a portion of these points can be analyzed, where the regions are sized such that features of the calibration object are substantially linear. Nearest neighbor points can be identified, and a local orientation determined in order to determine a relationship of each of the nearest points. Once identified, the points in each image can be correlated to corresponding points of the calibration object.

26 Claims, 6 Drawing Sheets

RECTIFYING CAMERA PAIRS

BACKGROUND

People are increasingly interacting with computers and other electronic devices in new and interesting ways. For example, mobile devices are increasingly offering multiple high quality cameras that enable additional types of functionality. In some devices, two of these high quality cameras can be used to provide three-dimensional (3D) image capture, for both still and video imaging. When using two distinct cameras, it is impossible to perfectly align the lens elements, such that a software adjustment is also required. Further, there will generally be distortions to images captured by each camera due to imperfect lenses and other elements that need to be accounted for to provide adequate imaging, particularly for wide angle lenses. Conventional approaches to aligning camera elements and removing distortions prove inadequate for wide angle lenses used with stereo imaging.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to capturing image information using an electronic device. In particular, various embodiments enable the capture of three-dimensional (3D) or stereoscopic image data using a pair of cameras or camera sensors positioned on a computing device. Such data can be used for purposes such as stereo imaging, head tracking, or gesture monitoring, among other such options. Approaches enable the cameras to be aligned through software mechanisms, as well as via mechanical alignment, in order to enable the captured stereo images to include a proper amount of disparity or depth information, as well as to have objects aligned in images captured by each camera. Calibration processes are presented that enable any misalignment between the cameras to be determined, which can then be addressed when processing images captured by those cameras. The calibration process also can be used to remove various lens distortions or other effects of the elements of each camera by determining the amount of distortion and then processing the captured images to remove the distortion.

Various other applications, processes, and uses are presented below with respect to the various embodiments.

Figure 1:
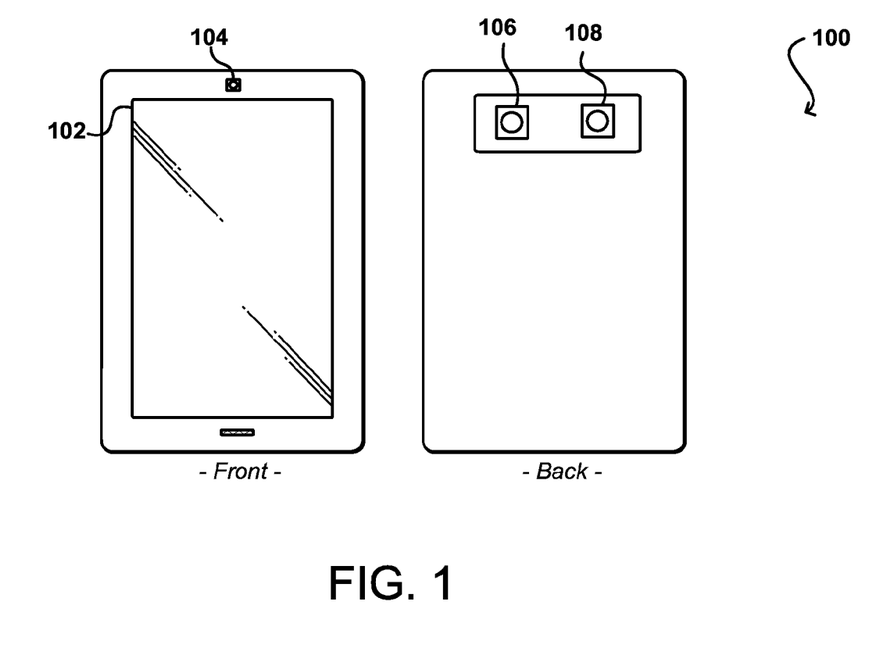
FIG. 1 illustrates front and back views of an example computing device including a pair of cameras for 3D imaging that can be utilized in accordance with various embodiments.

Many electronic and computing devices offer stereoscopic or three-dimensional (3D) imaging using at least one pair of high resolution matched cameras. For example, FIG. 1 illustrates front and back views of an example electronic device 100 wherein a front of the device includes a display screen 102 and other input elements, such as a front-facing camera 104 for video chat or other such purposes. The display can be, for example, a glasses-free 3D capable display, a display capable of presenting glasses-assisted 3D image information, or a conventional 2D display, among other such options. The device also includes a pair of matched cameras 106, 108 on a back side of the device. It should be understood that terms such as "front" and "back" are used for purposes of explanation and are not intended to require absolute orientations unless otherwise stated. These cameras 106, 108 are separated a distance sufficient to enable stereoscopic imaging over at least a determined distance, each with a determined field of view that at least partially overlaps. The stereo cameras typically are relatively high resolution cameras (e.g., 5.0 MP or above for conventional devices), such as CMOS or CCD cameras, among other such options. In some embodiments the stereo cameras each come with auto-focusing mechanisms, enabling the cameras to focus to different depths. As mentioned, the cameras can each include at least one wide-angle lens, such as a lens providing a field of view of at least sixty degrees, ninety degrees, or one-hundred and twenty degrees, among other such options.

When capturing a stereoscopic ("stereo") image, each of the pair of cameras captures an image at approximately the same time. The offset of the cameras will cause the location of objects in each image to be slightly offset, where the amount of offset is a factor of the separation of the cameras and the distance from the cameras to the objects. This varying offset with distance, otherwise known as disparity, provides the perception of depth in the image when the images are combined using a stereovision process. As illustrated in the example situation 200 of FIG. 2, a portable computing device 202 with a pair of stereo cameras on the back can be pointed at an object 206 such that the object is within the field of view 204 of the cameras. Since a display screen 208 is on the opposite side of the device 202, a user holding the device can view the stereo image being captured, assuming the display is capable of rendering the stereo information for a two- or three-dimensional display. The user thus can view a three-dimensional view of the object 206 as captured by the cameras and displayed on the display screen 208. It should be understood that a stereo image can be a combined image or can include a rendering of separate images captured by each of the stereo cameras in different embodiments.

Figure 2:
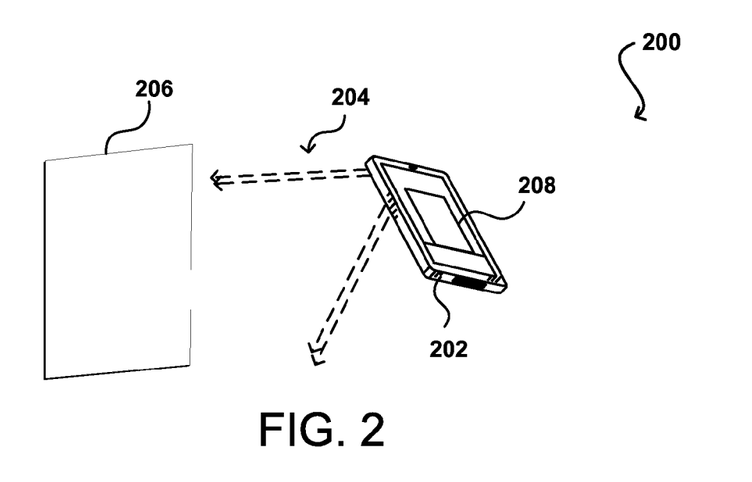
FIG. 2 illustrates an example of a computing device capturing an image of an object in accordance with various embodiments.

In order for the image of the object 206 to have the desired appearance in the captured stereo image, the cameras have to be aligned such that the object is properly positioned in each image to provide the desired depth information. Further, the images captured by each camera need to be relatively free of lens distortion or other artifacts that would cause the shape of the object to differ in the images captured by each camera.

Figure 3A:
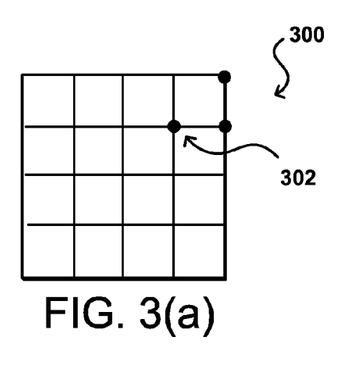
FIGS. 3(a), 3(b), 3(c), 3(d), and 3(e) illustrate examples of images of a calibration object that can be imaged and/or processed in accordance with various embodiments.

As mentioned, the cameras can be aligned mechanically to the extent possible and/or practical. There still can be at least some misalignment, however, such that it can be desirable to compensate for the misalignment through software and/or image processing. An approach in accordance with various embodiments can use a calibration object 300, such as the calibration grid illustrated in FIG. 3(a), to enable points to be located in an image captured by each camera. The relative location of these points in each image then can be correlated to generate a mapping, or at least an offset, by which points in at least one image should be translated or adjusted in order to compensate for any misalignment. For example, each point 302 on a grid can be located in an image captured by each camera, and an offset or function determined for matching these locations in the image, with respect to the expected amount of disparity between the images for the location of the calibration object. In some embodiments, an overall adjustment such as an amount of translation and/or rotation can be determined that should be applied to an image captured by at least one of the cameras. For example, if one of the cameras is determined to be angled at 0.5 degrees with respect to the other camera, images captured by one of the cameras can be rotated by 0.5 degrees to align the images. Similarly, if there is a determined translation or offset in terms of pixel values, distances, etc., at least one of the images can be shifted to compensate for the offset.

Figure 3B:
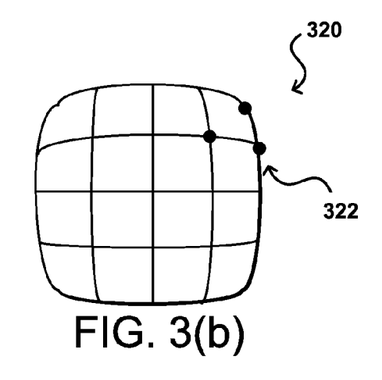

A potential problem with such an approach, however, is that lenses, particularly wide-angle lenses, can have irregularities and/or aspects that cause distortions to be present in images captured by cameras associated with those lenses. For example, FIG. 3(b) illustrates an example image 320 of a grid, or "calibration rig," that can be captured using one of the cameras with a wide angle lens. As can be seen, there can be an amount of distortion that can increase towards the edge of the lens, which can cause straight lines to appear to be bent or curved. While points can be identified as the intersection of lines or squares in the grid, for example, the distortion can make it difficult to correlate points that are next to each other in the image coordinate system, with respect to the calibration coordinate system. For the three points shown in FIG. 3(b) it might be difficult for an algorithm to determine which of these points are actually nearest neighbors, are along the same line in the grid, or are otherwise associated. The correlation is further complicated when the distortion is different for each camera, such that points in an image not only have to be correlated to the actual points that were imaged, but also the corresponding points in the image captured by the other camera.

Figure 3C:
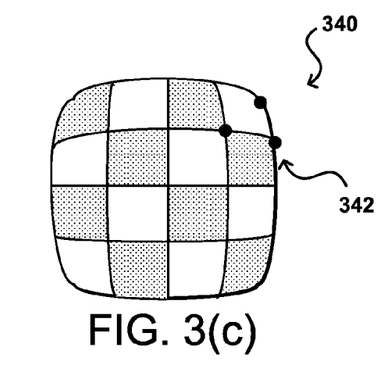

Accordingly, an approach in accordance with various embodiments uses a chessboard or checkerboard style calibration object. FIG. 3(c) illustrates an example image 340 that can be captured of the checkerboard image using the same lens as was used to capture the grid object in FIG. 3(b). As illustrated, the distortion still causes the points 322 to be located in positions that can be difficult to correlate. As illustrated in FIG. 3(c), however, different regions of the calibration object have different colors or intensities, such as may include black and white alternating squares or other such features. The edges formed between these squares can be used to correlate points in the image. For example, in FIG. 3(c) it can be seen that two of the points 342 are along an edge with white or high intensity values along the upper edge and black or low intensity values along the bottom edge. Since these points can be determined to lie upon a common edge, these points can be correlated with locations in the actual grid and determined to lie along the same horizontal line. The alternating intensities can also be used to quickly identify the location of intersection points in the images, which then can be correlated to corresponding locations on the calibration object. By determining connected points for the grid in each image, the amount of shift for each point can be determined and an appropriate adjustment determined for each point location for each camera. Such an approach enables the images captured by both cameras to be rectified and lens distortion effects minimized.

Figure 3D:
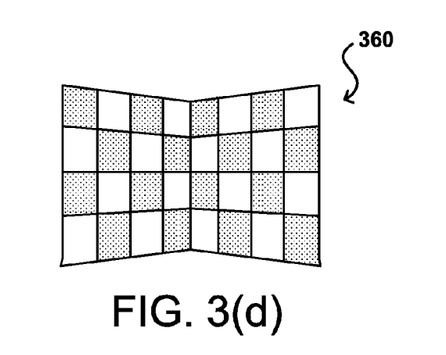
Figure 3E:
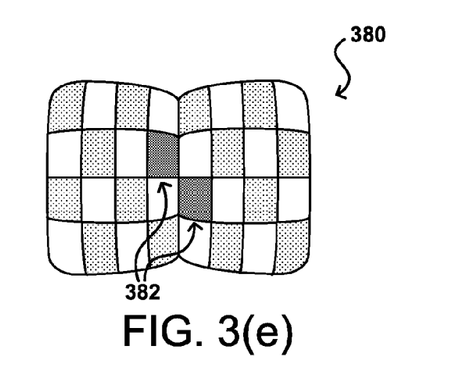

In some cases, however, it can be desirable to obtain depth information as well, as distortions and/or misalignments can potentially vary with depth or distance as well. Accordingly, approaches in accordance with various embodiments can utilize a three-dimensional calibration object to also obtain depth information. FIG. 3(d) illustrates an example of such a calibration object 360, wherein a checkerboard pattern is essentially folded about a vertical axis. In this example the folded portions of the object are at a ninety degree angle with respect to each other, although various other angles can be utilized as well within the scope of the various embodiments. The object can be positioned with the vertical axis as the furthest point from the camera, such that the object faces the stereo cameras like an open book to a reader. FIG. 3(e) illustrates an example image 380 that can be captured of such an object using one of the stereo cameras with a wide angle lens. As discussed, previously, the intensity, color, or pixel variations between features of the calibration object can be used to locate points of the grid and determine corresponding points. In this example, two of the features 382 have a different color or intensity value, such that an "anchor" point at the intersection of those features can be defined in each image and correlated to a point in the calibration object. An attempt can be made to locate points from the intersections of the calibration object features and correlate those points with respect to the reference point, which facilitates correlation among the pair of images for the two cameras as well. As discussed, the variations in the points can be used to remove distortions and/or misalignments through processing the captured images and reversing or otherwise accounting for the individual offsets. In at least some embodiments, a model can be generated for each camera and/or lens that can be used to remove alignment or distortion artifacts from images captured using the camera and/or lens.

As discussed, however, determining how to correlate points for various portions of the image may not be straightforward, as there can be significant distortions in portions of the image, particularly towards the outer edge of the image. As an example, consider the portion 400 of an image of a calibration object illustrated in FIG. 4(a). In this portion of the image, there is a significant curvature to the lines of the grid. Further, the lines are at a significant angle with respect to the orientation of the calibration object. Such distortions can create problems when attempting to correlate points of the grid. For example, two points 402, 404 are illustrated that can be determined to be relatively close to each other. While the relative locations of the points might make it appear as if the points are nearest neighbors along a horizontal line, in actuality the points do not lie along a common line and are not part of the four nearest neighbors of each point. Thus, it can be necessary to obtain additional information about at least one of these points in order to properly correlate the feature points of the image.

Figure 4A:
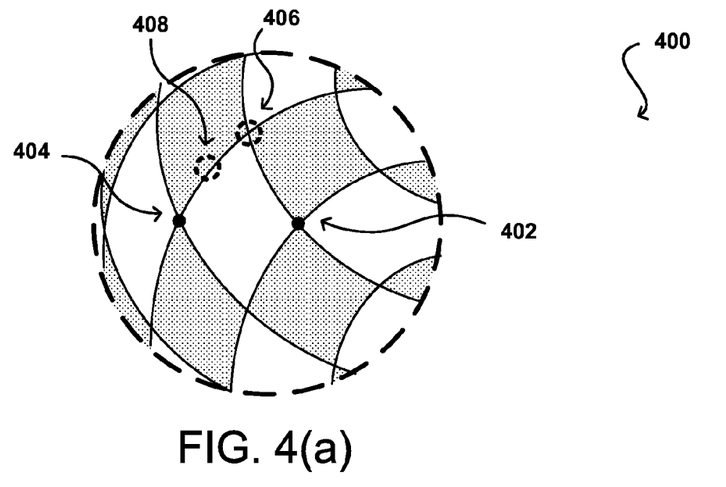
FIGS. 4(a), 4(b), 4(c), and 4(d) illustrate portions of an example process for determining relations between points of a calibration object that can be utilized in accordance with various embodiments.
Figure 4B:
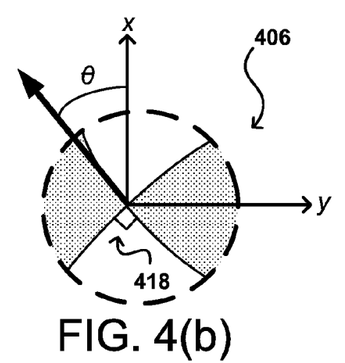

While the distortions can be relatively significant over a large portion of the image, when viewing a small region of the image the grid features can appear to be relatively linear due to a local smoothness property. As an example, a small region 406 of the image 400 illustrated in FIG. 4(*a*) is approximately centered around one of the intersection points of the grid of the calibration object. FIG. 4(*b*) illustrates an enlarged view of this region 406. As can be seen, the portions of the edges in this portion are relatively straight, and the intersection of these lines is still at approximately ninety degrees, or almost a right angle 418, for this small region. As can be seen, however, the grid is significantly rotated in this region with respect to a horizontal/vertical coordinate system, such as on the order of about forty degrees in this example. While the straightness of the lines and the orthogonally of the intersections is substantially maintained over an appropriately small region, it still can be difficult to interpret the features, as it can be difficult when looking only at the region 406 in FIG. 4(*b*) to determine which line corresponds to a horizontal line and which line corresponds to a vertical line of the example calibration object. It should be noted, of course, that alignments such as horizontal and vertical are used for simplicity of explanation and understanding, and that any appropriate features or orientations can be used with calibration objects within the scope of the various embodiments.

Figure 4C:
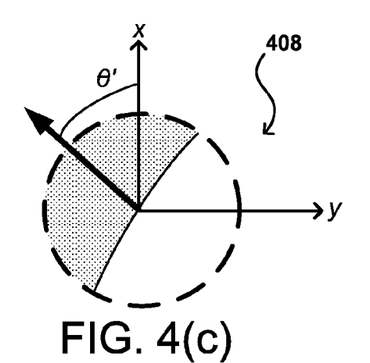
Figure 4D:
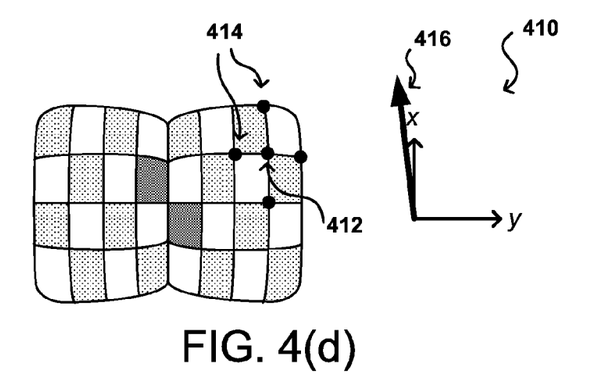

Similarly, another small region 408 corresponds to an edge portion of the grid. As illustrated in the enlarged view of FIG. 4(*c*), the line in the region is relatively straight, or linear, in the displayed region. As can be seen, however, the line is at approximately a forty-five degree angle with respect to horizontal, such that it can be difficult to tell whether the segment shown in the image corresponds to a horizontal or vertical line of the grid. Further, the amount of curvature in the pattern can vary at different locations in the image, such that different sized regions may need to be analyzed to satisfy a local smoothness criterion or other such value.

As discussed previously, an anchor point can be defined in a central portion of the calibration object, such that a view of the area around the anchor point will have relatively little distortion in the captured images. Since there is relatively little distortion near the anchor point, the horizontal and/or vertical nature of lines, as well as the direction of each nearest neighbor point to the anchor point, can be determined with a high level of certainty or confidence. Once the nearest neighbors are identified, each of those points now can be used as a point for analysis, where a small region can be used to analyze the region around the point to attempt to determine the four nearest neighbors (or less if near an edge), as well as a direction (e.g., north, south, east, or west) of each of those from the base point. As discussed, however, as the points get further from the anchor point the amount of distortion can increase, such that there can be an increase in angle of the calibration object and curvature of the pattern as represented in the image. Accordingly, a rotation angle (with respect to a horizontal and vertical or other such coordinate system) and a region size can be determined and/or updated for each point as well. For example, in FIG. 4(*b*) the angle θ is determined to correspond to the amount of rotation, and in FIG. 4(*c*) the angle θ' is determined to correspond to the amount of rotation. As the points get further from the anchor point, the rotation angle of an adjacent and already defined point can be used as a base orientation for the current point being analyzed. For example, if the intersection in the region 406 of FIG. 4(*b*) is determined to have rotation angle θ, then as the process moves away from the anchor point and hits another region 408, as illustrated in FIG. 4(*c*), the rotation angle θ can be used as the base rotation angle. As illustrated, there will be some deviation to the actual rotation angle at that location, but the deviation will typically be a small deviation from the base rotation angle, such that the new angle can properly be calculated, or the estimated angle updated, and it can be determined with a high level of confidence that the segment in the region 408 corresponds to a horizontal line of the calibration object. The rotation angle can also help to identify each of the nearest neighboring points, such as whether the point lies along a vertical or horizontal line of the grid from the current point. As the process propagates from the anchor point to the edges of the image, the process can be repeated with the nearest neighbors being identified and the rotation angle being updated accordingly. Similarly, an estimated region size can be determined for the second region 408 based on an earlier region, such as the first region 406, but a smoothness calculation or other process can be performed to determine the smoothness and update the size of the local region as appropriate.

As illustrated in the situation 410 of FIG. 4(*d*), a base point 412 can be determined from the image of the grid and the four nearest neighbors 414 determined, as may take advantage of analyzing small regions of the image to take advantage of the local linearity. Using the rotation angle from one of the adjacent and previously-analyzed points as a starting point, the nearest neighbor points can be identified (e.g., north, south, east, or west relative to the base point), and the rotation angle 416 can be updated for the current location, which then can be used as a starting point for the next point analysis, which likely will correspond to one of the nearest neighbor points 414. The process can continue until at least a determined portion, if not all, of the points of the image have been identified for correlation with the calibration object. It should be pointed out that where the portions of the angled calibration object meet the local linearity and right angle properties might not hold, such that these transition points might have to be handled separately. As the vertical line will generally be near the center of the image, however, the non-linearity will be minimal and the transition points located accordingly.

In at least some embodiments, a map of rotation angles at different locations can be determined for a particular type of lens, as the lens will have an average or default shape, and thus a general rotation map can be generated that provides a base indication that can be used when analyzing a specific lens. The information then can be updated when a particular lens or camera is calibrated, and that information can be stored and used for camera alignment and/or image processing as discussed elsewhere herein.

Figure 5:
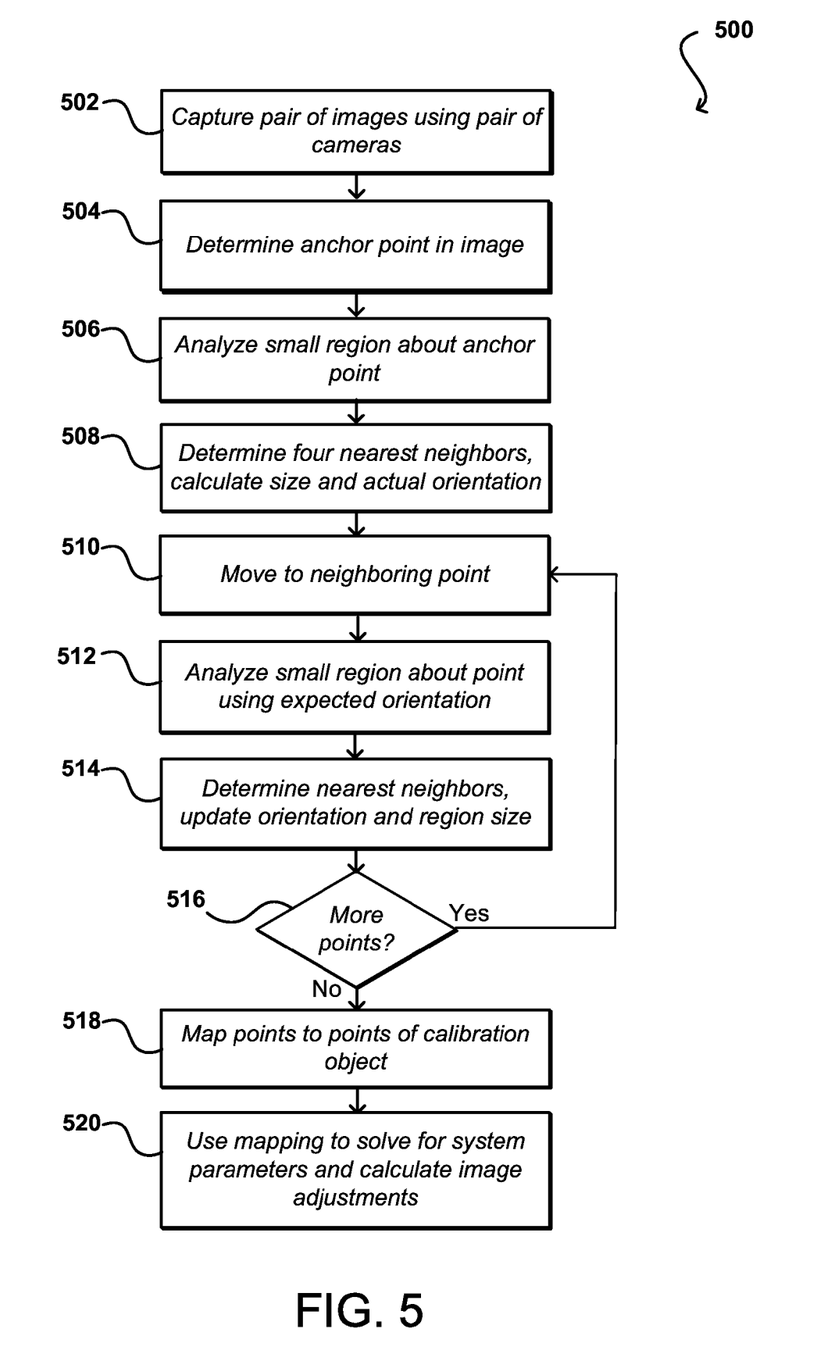
FIG. 5 illustrates an example process for aligning stereo cameras and removing lens distortions that can be utilized in accordance with various embodiments.

FIG. 5 illustrates an example process 500 for rectifying or otherwise accounting for distortions and other variations in images captured by a pair of stereo cameras that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, information about a coordinate system corresponding to a calibration object is obtained. As discussed, the calibration object can correspond to a flat or folded checkerboard-style object, among other such options. A pair of images of the calibration object can be captured 502 using a pair of cameras on a computing device. For each image, an anchor point can be determined 504, such as may correspond to a designated feature near a center of the calibration object. A relatively small region can be analyzed 506 around the anchor point, such that the lines in the region appear relatively linear and the intersection of the grid lines at the anchor point is substantially orthogonal. Based at least in part upon the lines and intersections in or near the region, the four nearest neighboring points (or "neighbors) can be determined 508, as may correspond to adjacent points along the grid lines running through the anchor point, as well as an orientation at the anchor point. Due at least in part to the anchor point being relatively near the center of the calibration object, and thus the captured image, the offset in orientation from normal should be relatively small. Using the orientation information the nearest neighbors can be identified such that their relationship to the anchor point is known. In at least some embodiments, the relative orientation of the points to the anchor point are stored both vectorially and with a designation of whether each point is north, south, east, or west of the anchor point, enabling the maintenance of a local compass.

Once the neighboring points are determined, the process can continue by moving 510 to at least one of the neighboring points and using that neighboring point as a base or anchor point for another analysis. A calibration grid can be traversed in a number of different ways, such as by using a spiral pattern, by analyzing points along horizontal lines, or by analyzing points along vertical lines, among other such options. A small region around that base point can be analyzed 512 using the orientation information from the previous determination. The nearest neighbors and orientation then can be determined 514 for that base point, and the neighbors identified. Further, the region can be analyzed to update the local orientation information as well as the appropriate size of the region to satisfy a local smoothness criterion. The process can continue until all (or at least a specified threshold of) the points are identified. If there are determined 516 to be more points to analyze, the process moves to the next point(s) for analysis. If all relevant points have been identified, the identified points of the image can be mapped 518 to the corresponding points of the calibration object in the real world. The mapping then can be used to solve 520 for the system parameters and calculate image adjustments, which can be used to effectively align the cameras and remove distortions from subsequently captured images.

There are many approaches known and/or used for combining stereo images as mentioned previously, such that the merging or combining will not be discussed herein in detail. Generally, displacements for similar features are determined between the two images to be merged and a depth is assigned based at least in part upon the lateral difference in location in the image information (as closer objects with have a greater lateral displacement in the captured image information). Several different approaches can assist with the depth mapping, including color mapping, grayscale mapping, texture mapping, and edge mapping, among others.

Figure 6:
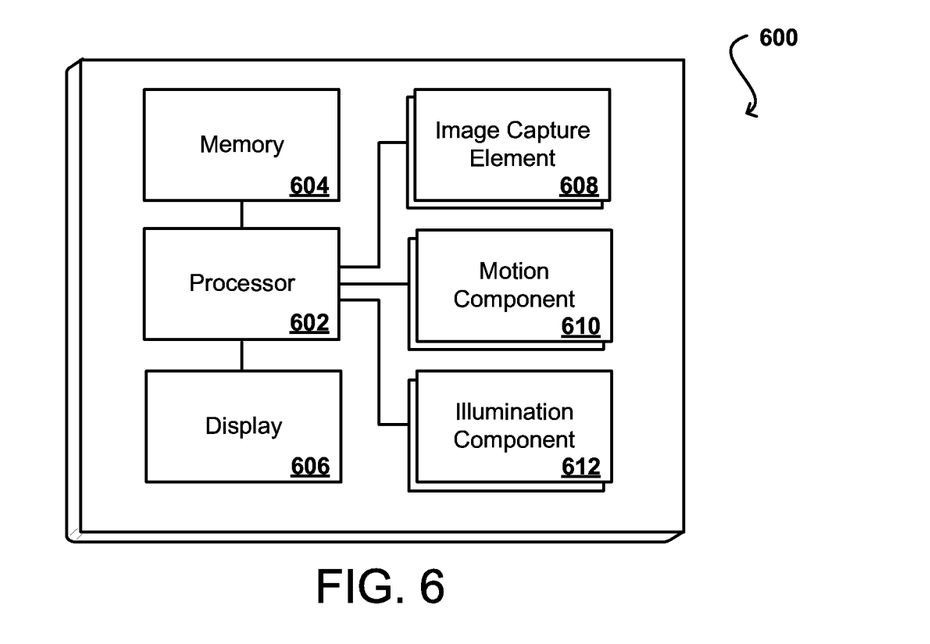
FIG. 6 illustrates an example configuration of components of a computing device such as that illustrated in FIG. 1.

FIG. 6 illustrates an example set of basic components of a computing device 600, such as the device 100 described with respect to FIG. 1. In this example, the device includes at least one central processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 608, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one dedicated gesture component, such as an IR sensor or detector, operable to capture information for use in determining gestures or motions of the user, which will enable the user to provide input through the portable device without having to actually contact and/or move the portable device. The device can include at least one motion component 610, such as an accelerometer or inertial sensor to measure translation, an electronic compass to calibrate direction in up to three dimensions, an electronic gyroscope to determine and/or track changes in orientation, and other such elements. Motion determining elements can help in determining movement and using the determined movement to correct image information. The device also can include at least one illumination element 612, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 7:
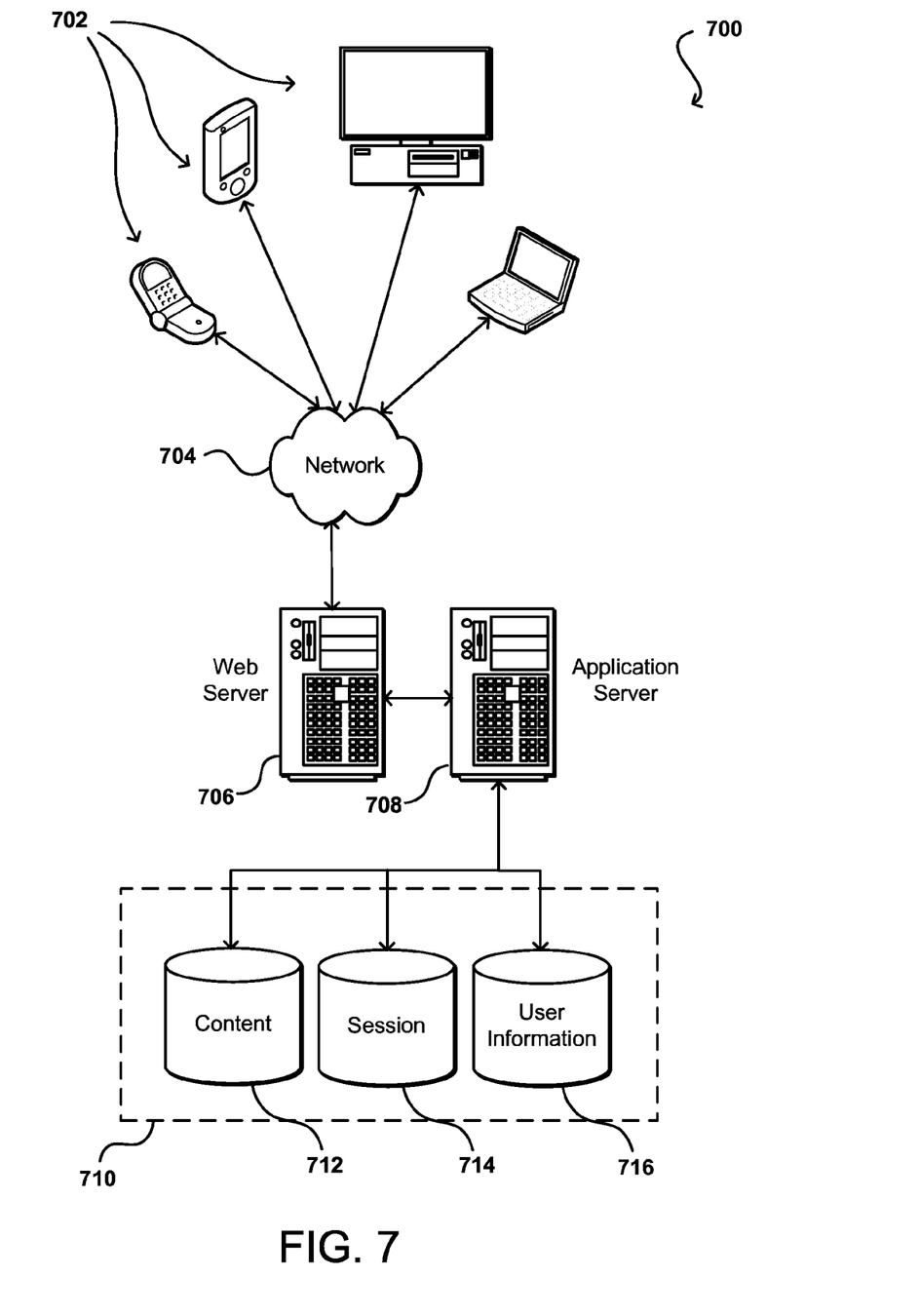
FIG. 7 illustrates an example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    capturing a first image including a first representation of a calibration object using a first camera;
    capturing a second image including a second representation of the calibration object using a second camera separated a distance from the first camera, the calibration object including a pattern of alternating regions;
    locating respective points in each of the first image and the second image corresponding to intersections of the alternating regions of the pattern;
    for each point of at least a portion of the respective points in each of the first image and the second image:
        analyzing a region including the point to identify nearest neighboring points, a size of the region being determined such that a respective measure of straightness of intersecting lines intersecting at the point is less than or greater than a predetermined measure of straightness by at most a specified value and such that an angle of the intersecting lines is less than or greater than ninety degrees by at most a specified number of degrees;
        determining a respective relationship of the nearest neighboring points relative to the point;
        determining a local orientation of the nearest neighboring points relative to a default coordinate system; and
        determining a respective correlation of each of the nearest neighboring points with a corresponding point on the calibration object based at least in part upon the respective relationship of the nearest neighboring points relative to the point and the local orientation of the nearest neighboring points; and
    storing information from the respective correlation for reducing at least one of misalignment or distortion effects from subsequent pairs of images captured by the first camera and the second camera, each subsequent pair of images capable of being used to generate a stereoscopic image display.

2. The computer-implemented method of claim 1, further comprising:
    applying a default model, to each of the first image and the second image to remove respective distortion due to a type of the first camera and the second camera, before locating the respective points in each of the first image and the second image corresponding to the intersections of the alternating regions of the pattern.

3. The computer-implemented method of claim 1, wherein the calibration object has a first portion and a second portion joined along a vertical axis, the first portion being at an angle with respect to the second portion.

4. The computer-implemented method of claim 1, wherein the calibration object has two intersecting regions of a predetermined intensity enabling a respective anchor point of the intersecting regions to be identified in each of the first image and the second image.

5. The computer-implemented method of claim 4, further comprising:
    locating the respective anchor point in each of the first image and the second image.

6. The computer-implemented method of claim 1, wherein locating the respective points in each of the first image and the second image corresponding to the intersections of the alternating regions is performed using a corners detection algorithm.

7. The computer-implemented method of claim 1, further comprising:
    using a second local orientation of second nearest neighboring points of an adjacent point in the calibration object relative to the default coordinate system as a default orientation for at least one of the nearest neighboring points; and
    determining a respective local orientation for each set of nearest neighboring points.

8. The computer-implemented method of claim 1, further comprising:
    using a second size of an adjacent region as an estimated size for the region.

9. The computer-implemented method of claim 7, wherein relationship information stored for the respective points in each of the first image and the second image includes vector data indicating at least one of: relationships among the respective points, relative orientations of the respective points, or relative regions sizes for the respective points.

10. The computer-implemented method of claim 1, wherein the pattern is a regular checker pattern.

11. The computer-implemented method of claim 1, wherein each of the first camera and the second camera includes a respective wide-angle lens having a respective field of view of at least ninety degrees.

12. A computing device, comprising:
    at least one device processor;
    a first camera having a first field of view;
    a second camera separated a distance on the computing device from the first camera, the second camera having a second field of view that at least partially overlaps the first field of view; and
    a memory device including instructions that, when executed by the at least one device processor, causes the computing device to:
        capture a first image including a first representation of a calibration object using the first camera, the calibration object including a pattern of alternating regions;
        capture a second image including a second representation of the calibration object using the second camera;
        locate respective points in each of the first image and the second image corresponding to intersections of the alternating regions of the pattern;
        for each point of at least a portion of the respective points in each of the first image and the second image:
            analyze a region including the point to identify nearest neighboring points, a size of the region being determined such that a respective measure of straightness of intersecting lines intersecting at the point is less than or greater than a predetermined measure of straightness by at most a specified value and such that an angle of the intersecting lines is less than or greater than ninety degrees by at most a specified number of degrees;
            determine a respective relationship of the nearest neighboring points relative to the point;
            determine a local orientation of the nearest neighboring points relative to a default coordinate system; and
            determine a respective correlation of each of the nearest neighboring points with a corresponding point on the calibration object based at least in part upon the respective relationship of the nearest neighboring points relative to the point and the local orientation of the nearest neighboring points; and
        store information from the respective correlation for reducing at least one of misalignment or distortion effects from subsequent pairs of images captured by the first camera and the second camera, each subsequent pair of images capable of being used to generate a stereoscopic image display.

13. The computing device of claim 12, wherein the calibration object has a first portion and a second portion joined along a vertical axis, the first portion being at an angle with respect to the second portion, and wherein the calibration object has two intersecting regions of a predetermined intensity enabling a respective anchor point of the two intersecting regions to be identified in each of the first image and the second image.

14. The computing device of claim 13, wherein the instructions when executed further cause the computing device to:
    locate the respective anchor point in each of the first image and the second image,
    wherein the respective correlation of each of the nearest neighboring points is based at least in part on a respective location of each of the nearest neighboring points relative to the respective anchor point.

15. The computing device of claim 12, wherein the instructions when executed further cause the computing device to:
    estimate the size of the region based at least in part upon a second size of an adjacent region.

16. The computing device of claim 12, wherein each of the first camera and the second camera includes a respective wide-angle lens having a respective field of view of at least ninety degrees.

17. The computing device of claim 12, wherein each set of nearest neighboring points lies along one or more lines of the calibration object including a respective anchor point.

18. A non-transitory computer-readable storage medium storing instructions that, when executed by at least one processor of a computing device, cause the computing device to:
    capture a first image including a first representation of a calibration object using a first camera, the calibration object including a pattern of alternating regions;
    capture a second image including a second representation of the calibration object using a second camera separated a distance from the first camera;
    locate respective points in each of the first image and the second image corresponding to intersections of the alternating regions of the pattern;
    for each point of at least a portion of the respective points in each of the first image and the second image:
        analyze a region including the point to identify nearest neighboring points, a size of the region being determined such that a respective measure of straightness of intersecting lines intersecting at the point is less than or greater than a predetermined measure of straightness by at most a specified value and such that an angle of the intersecting lines is less than or greater than ninety degrees by at most a specified number of degrees;
        determine a respective relationship of the nearest neighboring points relative to the point;
        determine a local orientation of the nearest neighboring points relative to a default coordinate system; and
        determine a respective correlation of each of the nearest neighboring points with a corresponding point on the calibration object based at least in part upon the respective relationship of the nearest neighboring points relative to the point and the local orientation of the nearest neighboring points; and
    store information from the respective correlation for reducing at least one of misalignment or distortion effects from subsequent pairs of images captured by the first camera and the second camera, each subsequent pair of images capable of being used to generate a stereoscopic image display.

19. The non-transitory computer-readable storage medium of claim 18, wherein the calibration object has a first portion and a second portion joined along a vertical axis, the first portion being at a predetermined angle with respect to the second portion, the calibration object having two intersecting regions of a predetermined intensity enabling a respective reference point of the two intersecting regions to be identified in each of the first image and the second image, and wherein the instructions when executed further cause the computing device to:
 locate the respective reference point in each of the first image and the second image, wherein the respective points in each of the first image and the second image are located based at least in part on a respective location of each of the respective points relative to the respective reference point.

20. The non-transitory computer-readable storage medium of claim 18, wherein the instructions when executed further cause the computing device to:
 locate a respective anchor point in each of the first image and the second image, wherein the respective correlation of each of the nearest neighboring points is based at least on part on a respective location of each of the nearest neighboring points relative to the respective anchor point.

21. The non-transitory computer-readable storage medium of claim 18, wherein the instructions when executed further cause the computing device to:
 estimate the size of the region based at least in part upon a second size of an adjacent region.

22. A computer-implemented method, comprising:
 capturing a first image including a first representation of a calibration object using a first camera, the calibration object including alternating regions;
 capturing a second image including a second representation of the calibration object using a second camera separated a distance from the first camera;
 determining a first point in the first image corresponding to an intersection of the alternating regions;
 identifying first neighboring points of the first point in a first region of the first image that has a first size such that a first respective measure of straightness of first intersecting lines intersecting at the first point is less than or greater than a predetermined measure of straightness by at most a specified value and such that a first angle of the first intersecting lines is less than or greater than ninety degrees by at most a specified number of degrees;
 determining a first orientation of the first neighboring points relative to a default coordinate system;
 determining a second point in the second image corresponding to the intersection;
 identifying second neighboring points of the second point in a second region of the second image that has a second size such that a second respective measure of straightness of second intersecting lines intersecting at the second point is less than or greater than the predetermined measure of straightness by at most the specified value and such that a second angle of the second intersecting lines is less than or greater than ninety degrees by at most the specified number of degrees;
 determining a second orientation of the second neighboring points relative to the default coordinate system;
 determining one or more adjustment values for aligning the first point and the second point based at least in part upon the first orientation and the second orientation; and
 determining stereoscopic image data based at least in part upon a third image captured by the first camera, a fourth image captured by the second camera, and the one or more adjustment values.

23. The computer-implemented method of claim 22, wherein the calibration object is a physical object having a predetermined inclination between at least a first portion and a second portion.

24. The computer-implemented method of claim 22, further comprising:
 determining a respective set of one or more adjustment values for aligning each intersection in the first image to a corresponding intersection in the second image.

25. The computer-implemented method of claim 24, further comprising:
 determining, in a sequential pattern, respective neighboring points for each intersection in the first image,
 wherein the sequential pattern is one of a spiral pattern, a horizontal line pattern, or a vertical line pattern.

26. The computer-implemented method of claim 22, wherein determining the first point in the first image includes:
 locating two regions in the first image each having a predetermined intensity,
 wherein the first point is an intersection of the two regions.

* * * * *